United States Patent
Odell et al.

(10) Patent No.: US 8,396,715 B2
(45) Date of Patent: Mar. 12, 2013

(54) CONFIDENCE THRESHOLD TUNING

(75) Inventors: Julian J. Odell, Kirkland, WA (US); Li Jiang, Redmond, WA (US); Wei Zhang, Kirkland, WA (US); Xiaodong He, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1671 days.

(21) Appl. No.: 11/168,278

(22) Filed: Jun. 28, 2005

(65) Prior Publication Data
US 2006/0293886 A1 Dec. 28, 2006

(51) Int. Cl.
*G10L 21/00* (2006.01)
*G10L 15/00* (2006.01)

(52) U.S. Cl. ............... 704/270; 704/231; 704/270.1

(58) Field of Classification Search .......... 704/231, 704/251, 270, 275
See application file for complete search history.

(56) References Cited

U.S. PATENT DOCUMENTS

| | | | |
|---|---|---|---|
| 6,269,336 B1* | 7/2001 | Ladd et al. | 704/270 |
| 7,552,055 B2* | 6/2009 | Lecoeuche | 704/270.1 |
| 2002/0049596 A1* | 4/2002 | Burchard et al. | 704/270 |
| 2002/0169594 A1* | 11/2002 | Yasuda et al. | 704/5 |
| 2003/0130849 A1* | 7/2003 | Durston et al. | 704/270 |
| 2004/0049375 A1* | 3/2004 | Brittan et al. | 704/9 |
| 2004/0260543 A1* | 12/2004 | Horowitz et al. | 704/221 |
| 2005/0216264 A1* | 9/2005 | Attwater et al. | 704/239 |
| 2006/0115070 A1* | 6/2006 | Bushey et al. | 379/265.02 |

OTHER PUBLICATIONS

Komatani, "Spoken Dialogue Systems for Information Retrieval with Domain Independent dialogue Strategies", Sep. 2002 <http://d01-404.kulib.kyoto-u.ac.jp/dspace/bitstream/2433/68898/1/D_Komatani_Kazunori.pdf>, pp. 1-107.*

Levin et al, "A stochastic model of human-machine interaction for learning dialog strategies", IEEE Trans. on Speech and Audio Processing, 8(1):11-23, 2000.*

* cited by examiner

*Primary Examiner* — Richemond Dorvil
*Assistant Examiner* — Olujimi Adesanya
(74) *Attorney, Agent, or Firm* — Merchant & Gould

(57) ABSTRACT

An expected dialog-turn (ED) value is estimated for evaluating a speech application. Parameters such as a confidence threshold setting can be adjusted based on the expected dialog-turn value. In a particular example, recognition results and corresponding confidence scores are used to estimate the expected dialog-turn value. The recognition results can be associated with a possible outcome for the speech application and a cost for the possible outcome can be used to estimate the expected dialog-turn value.

20 Claims, 4 Drawing Sheets

CONFIDENCE THRESHOLD TUNING

BACKGROUND

The discussion below is merely provided for general background information and is not intended to be used as an aid in determining the scope of the claimed subject matter.

A speech server can be utilized to combine Internet technologies, speech-processing services, and telephony capabilities into a single, integrated system. The server can enable companies to unify their Internet and telephony infrastructure, and extend existing or new applications for speech-enabled access from telephones, mobile phones, pocket PCs and smart phones.

Applications from a broad variety of industries can be speech-enabled using a speech server. For example, the applications include contact center self-service applications such as call routing and customer account/personal information access. Other contact center speech-enabled applications are possible including travel reservations, financial and stock applications and customer relationship management. Additionally, information technology groups can benefit from speech-enabled applications in the areas of sales and field-service automation, E-commerce, auto-attendants, help desk password reset applications and speech-enabled network management, for example.

In speech recognition, a speech recognizer receives an acoustic signal input from a speech utterance and produces a recognition result. Several parameters are used in the recognition process. For example, a confidence classifier estimates how likely the recognition result is correct. The confidence classifier typically assigns a confidence score between 0-1 for the result. In general, the higher the score is, the more likely the result is correct. The score is compared to a threshold to determine one or more tasks to perform. Other parameters can include a structure of a speech application and grammars used for recognition.

In a simple dialog scenario, the speech application interacts with a user through a series of dialog turns to perform one or more transactions that the user requests. A transaction can be one or more tasks or actions that are performed by the speech application. In the application, the absolute value of the confidence score is not directly used. Usually, one or more confidence thresholds are employed. In one example, a confidence threshold pair is used: TH1 and TH2, where $0<TH1<TH2<1$. For a recognition result, if its confidence score is higher than TH2, the application is confident the recognition result is correct and accepts the result directly. If the score is lower than TH1, the system treats the result as an incorrect result and rejects the results directly. If the score is between TH1 and TH2, the system needs to confirm with the user about the result. Complex speech applications include multiple grammars and multiple dialog turns to perform various tasks. The applications can be viewed as a combination of simple applications wherein each application has one or more confidence thresholds.

In a name-dialer application, a user may wish to connect to a person at an organization. For example, the application may ask the user "Who would you like to call?" and produce a recognition result and associated confidence score of a name in a directory based on the user's response. If the confidence score of the recognition result is higher than TH2, the result is treated as correct and the application transfers the call to a person associated with the name. If the score is lower than TH1, the result is likely to be incorrect and the application will ask for a name again or confirm with the user about the recognized name. Other thresholds and scenarios can further be used.

Parameters for a speech application such as the thresholds, structure and grammars can be time consuming and expensive to establish. Previously, confidence thresholds were set heuristically. Typically, expensive consultants need to spend large amounts of time to establish thresholds for applications after obtaining large amounts of training data. As a result, there is a large expense to establish confidence thresholds.

SUMMARY

This Summary is provided to introduce some concepts in a simplified form that are further described below in the Detailed Description. This Summary is not intended to identify key features or essential features of the claimed subject matter, nor is it intended to be used as an aid in determining the scope of the claimed subject matter.

An expected dialog-turn (ED) value is estimated for evaluating a speech application. Parameters such as a confidence threshold setting can be adjusted based on the expected dialog-turn value. In a particular example, recognition results and corresponding confidence scores are used to estimate the expected dialog-turn value. The recognition results can be associated with a possible outcome for the speech application and a cost for the possible outcome can be used to estimate the expected dialog-turn value.

DETAILED DESCRIPTION

The description below relates to providing a measurement to optimize experience for speech applications. An expected dialog-turn (ED) measurement is used as a metric to tune parameters such as confidence thresholds, recognition grammars and dialog structure. ED is the expectation (probability-weighted average) of the number of dialog-turns needed to successfully accomplish a transaction. The ED reflects the average time a user will spend to successfully finish the transaction, and therefore represents the calling cost of the user.

A method is utilized to estimate the expected dialog-turn measurement. Then, a minimum expected dialog-turn (MED) estimation for optimal confidence threshold tuning is developed, where the optimal threshold can be determined by minimizing the expectation of the number of dialog-turns, so as to minimize the user's calling cost and achieve the best user experience.

Figure 1:
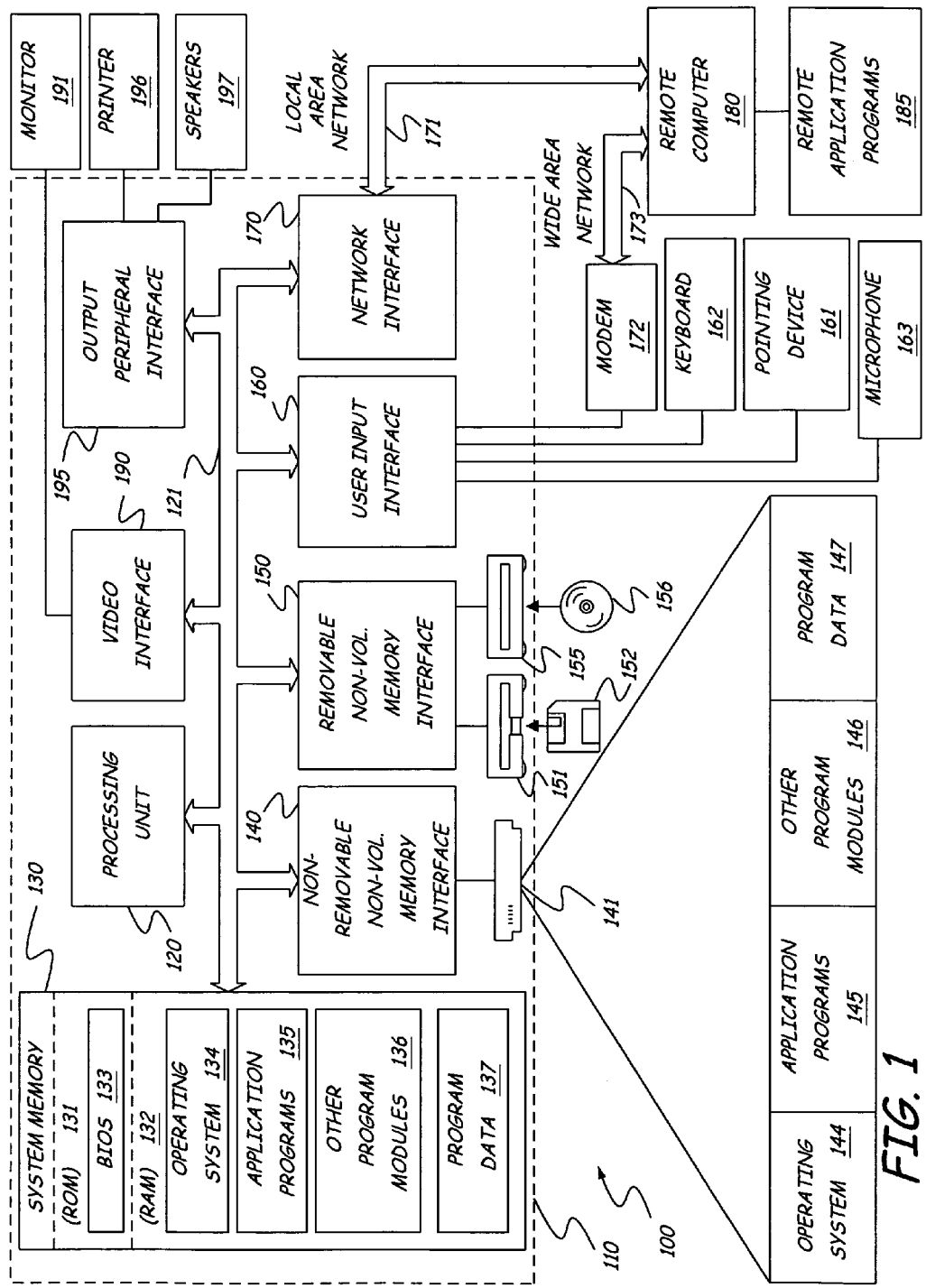
FIG. 1 is a block diagram of a general computing environment.

One embodiment of an illustrative environment in which the present invention can be used will now be discussed. FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available medium or media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
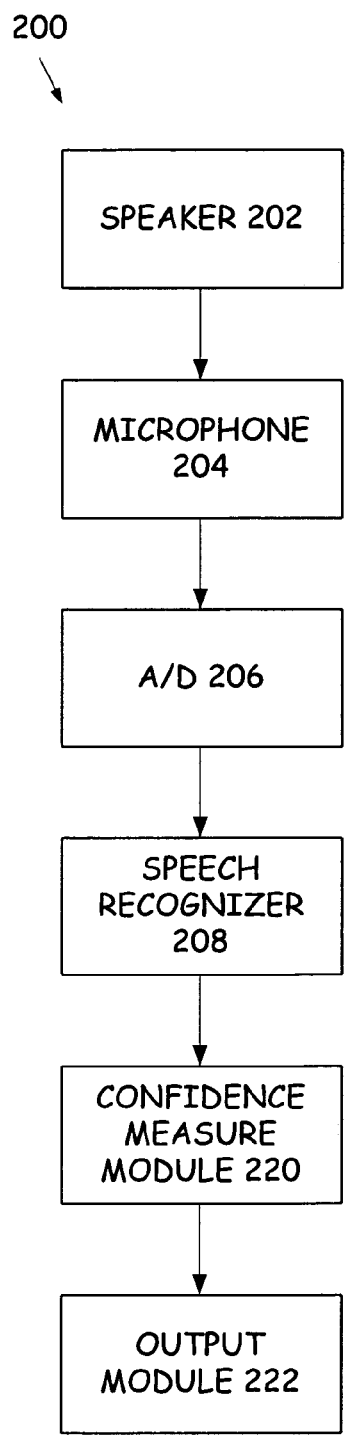
FIG. 2 is a block diagram of a speech recognition system.

FIG. 2 provides a block diagram of a speech recognition system 200. In FIG. 2, a speaker 202, speaks into a microphone 204. Microphone 204 can be directly connected to a computer or be remote from the computer, for example be coupled to the computer by a telephone network. Audio signals detected by microphone 204 are converted into electrical signals that are provided to analog-to-digital converter 206. A-to-D converter 206 converts the analog signal from microphone 204 into a series of digital values. These digital values are provided to a speech recognizer 208. Speech recognizer 208 identifies one or more likely words based on the signals from A/D converter 206. Speech recognizer 208 also utilizes a lexicon, a language model (for example, based on an N-gram, context-free grammars, or hybrids thereof), and an acoustic model to provide a hypothesis of a word on words that were spoken.

The most probable hypothesis word(s) are provided to a confidence measure module 220. Confidence measure module 220 identifies which words are most likely to have been properly identified by speech recognizer 208 as a recognition result. Confidence measure module 220 then provides the hypothesis word(s) to an output module 222 along with a score corresponding to the likelihood that the recognition result corresponds to the content of what was spoken by speaker 202. Output module 222 performs tasks based on the recognition result and the score. Output module 222 can utilize one or more confidence thresholds in determining what tasks to perform. For example, a simple yes/no question may have a single confidence threshold. Other, more complex situations can have two, three or more confidence thresholds.

Figure 3:
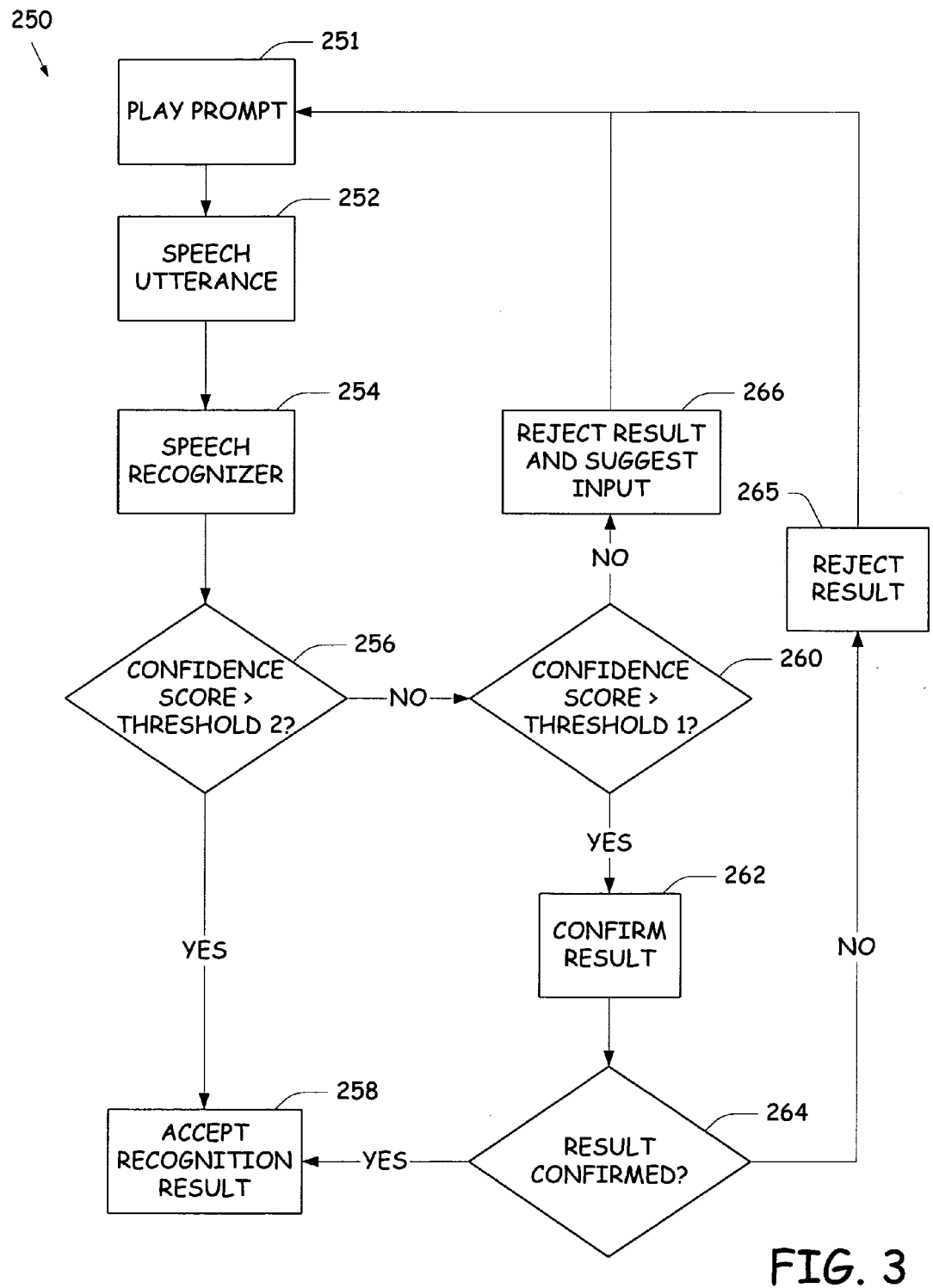
FIG. 3 is a flow diagram of a speech application.

FIG. 3 is a flow diagram of a method 250 for an exemplary speech application. The speech application uses two thresholds, although one or more thresholds can be used depending on the particular application. Method 250 begins at step 251 wherein a user is prompted for a speech utterance. A speech utterance is received at step 252. At step 254, the speech utterance is recognized using a speech recognizer. The speech recognizer can utilize one or more grammars to determine a recognition result in the speech utterance. For example, a name-dialer application can include a grammar of all names in a directory. Additionally, the speech recognizer returns a confidence score for the recognition result based on the likelihood that the recognition result corresponds to the content of the speech utterance. Various methods and systems can be used to recognize the speech and compute the confidence score.

The speech application then determines at step 256 whether the confidence score for the recognition result is greater than an upper threshold, herein referred to as threshold 2 (TH2). If the confidence score is greater than TH2, the recognition result is accepted at step 258. The transaction is then complete and any tasks associated with the transaction are performed based on the recognition result. If it is determined that the confidence score is less than TH2, the speech application will determine if the confidence score is greater than a lower threshold, herein referred to as threshold 1 (TH1), at step 260.

If the confidence score is greater than TH1, the speech application proceeds to step 262, wherein the recognition result is confirmed. The confirmation can be a single choice (for example a choice between yes/no) or a multiple choice (for example a choice among options 1, 2, 3, etc.). The confirmation process itself can include its own thresholds, that can further be adjusted as presented herein. The speech application then determines, at step 264, whether the recognition result was confirmed by the user. If the result was confirmed, the speech application proceeds to step 258, wherein the recognition result is accepted as described above. If the recognition result is not confirmed, the speech application will reject the result at step 265 and start over and return to step 251, wherein a prompt is played. Alternatively, the application can change a dialog flow after a user fails multiple times. For confidence scores that are less than TH1, the speech application proceeds to step 256. Since the confidence score is particularly low for the recognition results, expected input can be suggested by the speech application. For example, if the application expects a name, the application can suggest the user say a name.

Using the name-dialer application as an example, a name spoken by the user will be recognized with a corresponding confidence score at step 254. The result can be either correct or incorrect, that is the result will correctly recognize the utterance or not correctly recognize the utterance. Additionally, the confidence score can be low (less than TH1 and thus pass through step 266), medium (between TH1 and TH2 and thus pass through step 262) or high (greater than TH2 and thus be accepted at step 258). Thus, one of the following outcomes will result: 1) recognition correct, low-confidence score and reject, 2) recognition correct, mid-confidence score and confirm, 3) recognition correct, high-confidence score and accept, 4) recognition incorrect, low-confidence score and reject, 5) recognition incorrect, mid-confidence score and confirm, 6) recognition incorrect, high-confidence score and accept. More complicated scenarios, such as those that include multiple confirmation choices or where answers may not be included in the recognition grammar (Out-Of-Grammar (OOG) answers), will be discussed below.

Figure 4:
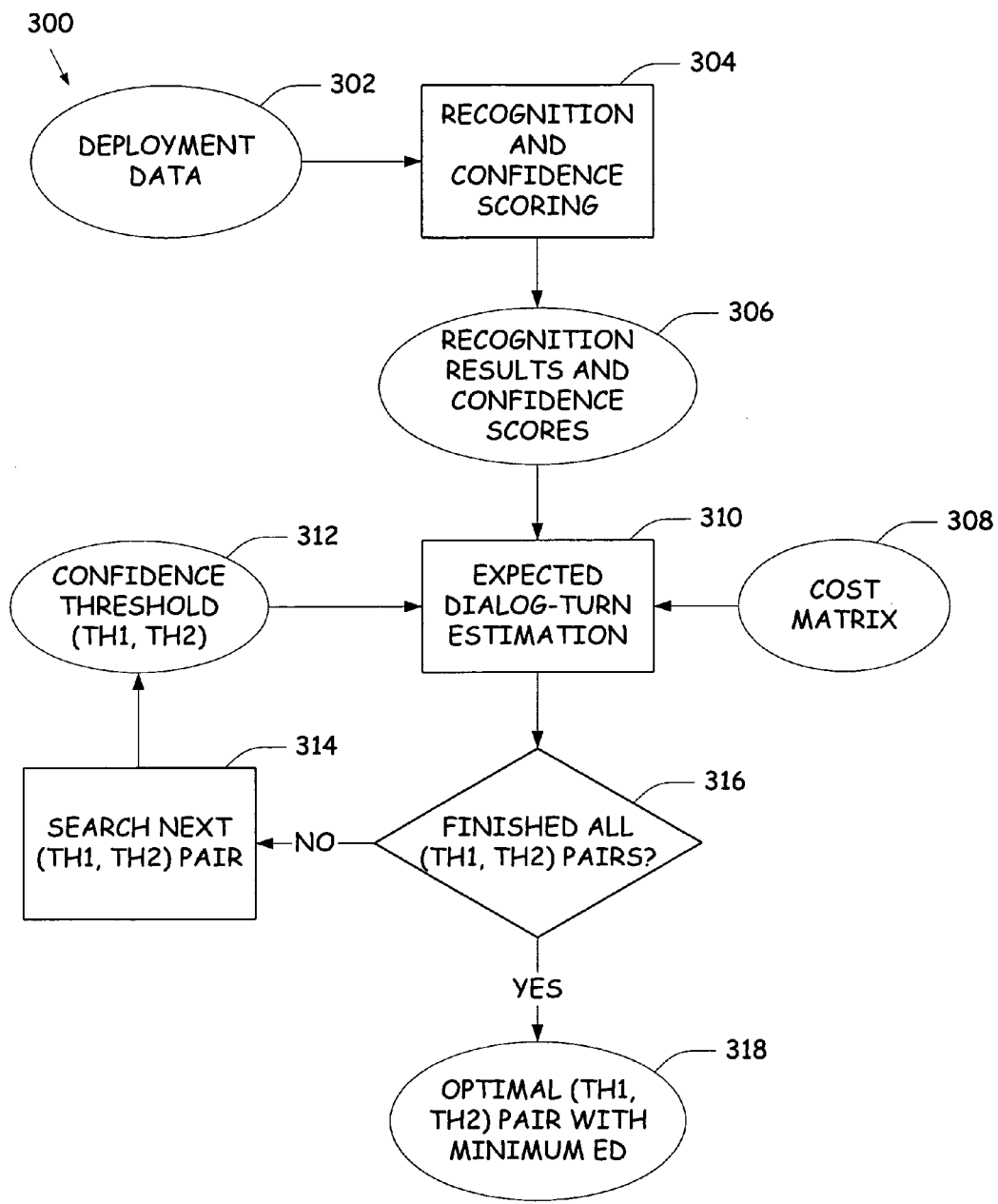
FIG. 4 is a flow diagram for establishing confidence thresholds in a speech application.

FIG. 4 is a flow diagram 300 for adjusting confidence thresholds TH1 and TH2. The speech application can be deployed to obtain deployment data 302 for a number of cases. For example, deployment data 302 can be obtained by using the speech application in a live or "pilot" setting wherein a number of users interact with the speech application as discussed above with regard to FIG. 2. The deployment data 302 will undergo a recognition and confidence scoring process 304 to obtain recognition results and corresponding confidence scores 306. Given the recognition results and corresponding confidence scores, a probability of each outcome can be estimated. A cost for each outcome can also be assigned to develop a cost matrix 308. Cost matrix 308 includes a probability and associated cost for each outcome. The probability is computed as the number of instances for a particular outcome divided by the total number of cases in deployment data 302. If the cost for each outcome is assigned in terms of number of dialog turns, an expected dialog-turn (ED) measure can be estimated as the probability-weighted average number of dialog-turns over all cases. In one embodiment, the probability for each possible outcome is determined based on a number of recognition results associated with each possible outcome. The outcomes can be divided into two groups: cost-fixed group, and cost-floating group.

Cost-fixed Group:

For outcomes in this group, costs are simple and easy to estimate. Outcomes 2 and 3 above belong to this group. For example, only 1 dialog-turn is used for outcome 3, since the user only speaks one utterance (the name in the first dialog-turn) then the system directly transfer the call to the designated person. For outcome 2, an extra confirmation is used. If confirmation is a simple Yes/No question, the cost of confirmation can be set to 0.5 dialog-turns, so the total cost for outcome 2 is 1.5 dialog-turns.

Cost-floating Group:

Other outcomes belong to this group. The costs for these outcomes are not straightforward. For example, for outcome 1, if the user answers the name "John" and the system rejects the recognition result due to a low-confidence score and asks again: "I can't hear you, who would you like to call?" the user is rejected and may be rejected again and it is not determined when the user can finally reach John. Therefore, a fixed cost cannot be set for outcome 1. However, a floating cost can be set. In such a situation, the first dialog-turn is wasted and the user needs to start over, so the cost of case 1 is: 1+costof (start_over), where costof(start_over) is a floating number that depends on the application. Actually, the cost is just the average number of dialog-turns of the application, which is the expected dialog-turn (ED). For a difficult task that has a high ED, if the user is rejected the first time and starts over, it is very possible that the user will be rejected the next time, so the costof(start_over) can be a large number. On the other hand, for an easy task that has a low ED, even if the user is rejected the first time, it is very possible that the user can pass at the second try, so the costof(start_over) can be small.

Similarly, the costs of other outcomes can be set. The cost of outcomes 4 is the same as outcome 1 due to the same reason. The cost of outcome 5 is 1.5+costof(start_over), since the first dialog-turn and confirmation are wasted before start-over. Outcome 6 is special. Unlike false rejection, for the false acceptance case, an undesired transaction is made and the user needs to pay extra effort to correct the mistake and recover the transaction before the user can start over. So for outcome 6, the first dialog-turn is wasted, and at least one more dialog-turn is needed to correct the mistake. Additional effort can be needed depending on the transaction. So the cost of outcome 6 is 2+costof(start_over)+FApenalty, where Fapenalty (False Acceptance Penalty) counts for the extra effort the user pays.

FApenalty can be set dependent upon a particular task. FApenalty can be expressed as the cost of recovering a wrong transaction due to a false acceptance, in terms of number of dialog-turns. For false acceptance sensitive tasks, such as name-dialing, the FApenalty can be high, for example 4, (transferring to a wrong person may require several utterances to express regret and explain the mistake to that person and then start over, and the caller may feel embarrassed). For false acceptance in-sensitive tasks, such as weather inquiring, the FApenalty can be low, say, set to 1.

Other ways to set FApenalty can also be used. For example, some applications require that only directly accept results with 90% accuracy or larger. This requirement can be translated to a FApenalty=4. For example, suppose the result has an accuracy rate of c %. The cost of "confirm" and "accept" can be compared. To minimize ED, the smaller cost can be chosen.

Cost [confirmation] $1.5*c\ \%+(1.5+ED)*(1-c\ \%)$

Cost [acceptance] $1.0*c\ \%+(2+ED+FA\text{penality})*(1-c\ \%)$

If cost[acceptance]<cost[confirmation], a result is accepted. Otherwise, the result is confirmed. So, only results with accuracy of c %>(FApenality +0.5)/(FApenality +1.0) will be accepted directly. In other words, if we set FApenality=4, results with accuracy of c %>90% will be accepted.

Cost matrix 308 can be developed including the cost of each outcome. Table 1 below is a cost matrix for outcomes 1-6 above with associated fixed and floating costs. Each outcome number is marked in parentheses.

TABLE 1

| Single Utterance | recognition result | Reject | Confirm | Accept |
|---|---|---|---|---|
| In Grammar | Correct | (1) 1 + ED | (2) 1.5 | (3) 1 |
| In Grammar | Incorrect | (4) 1 + ED | (5) 1.5 + ED | (6) 2 + ED + FApenalty |

For scenarios that include OOG answers or multiple-confirmation steps, a cost matrix includes several additional possibilities. The possibilities are included in outcomes 1-13 below, which provide example dialogs between a user and an application. In the outcomes below, "S-confirm" means single yes/no confirmation, "M-confirm" means multiple-confirmation, "in-alt" means the correct result is in an alternates list, and "out-alt" means the correct result is not in an alternates list.

| (1) In-Grammar COST: 1 + (start-over) | Correct | Reject |
|---|---|---|
| Application: | who would you like to contact? | |
| USER: | Andy Teal | |
| Application: | Sorry, who would you like to contact? | |
| USER: | ... (start-over) | |
| Application: | ... | |

| (2) In-Grammar COST: 1.5 | Correct | S-Confirm |
|---|---|---|
| Application: | who would you like to contact? | |
| USER: | Andy Teal | |
| Application: | Are you looking for Andy Teal? | |
| USER: | Yes | |
| Application: | [transfer to Andy Teal ... ] | |

| (3) In-Grammar COST: 2 | Correct | M-Confirm |
|---|---|---|
| Application: | who would you like to contact? | |
| USER: | Andy Teal | |
| Application: | Are you looking for 1, Andy Teal, 2, Andy Jeal, or 3, Candy Teal? | |

-continued

|  |  |  |
|---|---|---|
| Application: | Please say the number. | |
| USER: | No. 1 | |
| Application: | [transfer to Andy Teal . . . ] | |

(4) In-Grammar
COST: 1

| dialog-turn | Correct | Accept |
|---|---|---|

|  |  |
|---|---|
| Application: | who would you like to contact? |
| USER: | Andy Teal |
| Application: | [transfer to Andy Teal . . . ] |

(5) In-Grammar
COST: 1 +

| (start-over) | Incorrect | Reject |
|---|---|---|

|  |  |
|---|---|
| Application: | who would you like to contact? |
| USER: | Andy Teal |
| Application: | Sorry, who would you like to contact? |
| USER: | . . . (start-over) |
| Application: | . . . |

(6) In-Grammar
COST: 1.5 +

| (start-over) | Incorrect | S-Confirm |
|---|---|---|

|  |  |
|---|---|
| Application: | who would you like to contact? |
| USER: | Andy Teal |
| Application: | Are you looking for Candy Jeal? |
| USER: | No |
| Application: | Sorry, who would you like to contact? |
| USER: | . . . (start over) |
| Application: | . . . |

(7) In-Grammar

| COST: 2 | Incorrect | M-Confirm & in alternate |
|---|---|---|

|  |  |
|---|---|
| Application: | who would you like to contact? |
| USER: | Andy Teal |
| Application: | Are you looking for 1, Candy Teal, 2, Andy Jeal, or 3, Andy Teal? Please say the number. |
| USER: | No. 3 |
| Application: | [transfer to Andy Teal . . . ] |

(8) In-Grammar
COST: 2 +

| (start-over) | Incorrect | M-Confirm & out of alternate |
|---|---|---|

|  |  |
|---|---|
| Application: | who would you like to contact? |
| USER: | Andy Teal |
| Application: | Are you looking for 1, Candy Teal, 2, Andy Jeal, or 3, Andy Meal? Please say the number. |
| USER: | None of them |
| Application: | Sorry, who would you like to contact? |
| USER: | . . . (start-over) |
| Application: | . . . |

(9) In-Grammar
COST: 2 +
FApenalty +

| (start-over) | Incorrect | Accept |
|---|---|---|

|  |  |
|---|---|
| Application: | who would you like to contact? |
| USER: | Andy Teal |
| Application: | [transfer to Andy Teal . . . ] |
| USER: | Stop! (recover the wrong transferring, . . . , start over) |
| Application: | Sorry, who would you like to contact? |
| USER: | . . . (start over) |
| Application: | . . . |

(10) Out-Of-Grammar
COST: 1 +

| (start-over) −1 | Incorrect | Reject |
|---|---|---|

|  |  |
|---|---|
| Application: | who would you like to contact? |
| USER: | Building eight |

|  |  |
|---|---|
| Application: | Sorry, who would you like to contact? |
| USER: | . . . (start-over) |
| Application: | . . . |

(11) Out-Of-Grammar
COST: 1.5 +

| (start-over) −1 | Incorrect | S-Confirm |
|---|---|---|

|  |  |
|---|---|
| Application: | who would you like to contact? |
| USER: | Building eight |
| Application: | Are you looking for Bill Gates? |
| USER: | No |
| Application: | Sorry, who would you like to contact? |
| USER: | . . . (start-over) |
| Application: | . . . |

(12) Out-Of-Grammar
COST: 2 +

| (start-over) −1 | Incorrect | M-Confirm |
|---|---|---|

|  |  |
|---|---|
| Application: | who would you like to contact? |
| USER: | Building eight |
| Application: | Sorry, are you looking for 1, Bill George, 2, Burd Gates, or 3, Burd George? |
| USER: | None of them. |
| Application: | Sorry, who would you like to contact? |
| USER: | . . . (start-over) |
| Application: | . . . |

(13) Out-Of-Grammar
COST: 2 +
FApenalty +

| (start-over) −1 | Incorrect | Accept |
|---|---|---|

|  |  |
|---|---|
| Application: | who would you like to contact? |
| USER: | Building eight |
| Application: | [transfer to Bill Gates . . . ] |
| USER: | Sorry, Stop please.(recover the erong transferring, start over) |
| Application: | Who would you like to contact? |
| USER: | . . . (start-over) |
| Application: | . . . |

The cost matrix for outcomes 1-13 and corresponding costs is expressed in Table 2 below.

TABLE 2

| Single Utterance | recognition result | Reject | S-Confirm | M-Confirm | Accept |
|---|---|---|---|---|---|
| In Grammar | Correct | (1) 1 + ED | (2) 1.5 | (3) 2 | (4) 1 |
| In Grammar | Incorrect | (5) 1 + ED | (6) 1.5 + ED | (7) in-alt: 2 (8) out-alt: 2 + ED | (9) 2 + ED + FApenalty |
| Out of Grammar | Incorrect | (10) ED | (11) 0.5 + ED | (12) 1 + ED | (13) 1 + ED + FApenalty |

An ED measure can be estimated using expected dialog-turn estimation process 310. The estimate can be expressed as:

$$ED = \sum_{i \ \{all\ cases\}} [Pr(i) * Cost(i)],$$

Where Pr(i)=[# instance of outcome i]/[# total instances].

Recognition results and confidence scores 306 are associated with a possible outcome in cost matrix 308 given a threshold pair 312. Given the ED as the confidence metric and the formula for computing ED, a minimum expected dialog turn based on threshold pairs can be calculated. Given a TH1 and TH2 312, the corresponding ED can be estimated given recognition results and confidence scores 306 using process 310. A search process 314 is used to select valid threshold pairs (TH1, TH2) used as TH1, TH2 pairs 312. Decision process 316 determines if all threshold pairs have been calcualted. Given 0<TH1<TH2<1, the EDs of all valid pairs (TH1, TH2) are computed using process 310. In one example, a 0.05 search step is used for threshold pairs. Each threshold pair can be used to calculate an ED. Then, the threshold pair with the lowest ED is selected as an optimal confidence threshold 318 for the application. It is worth noting that method 300 can be initiated at different times to reevaluate the speech application, for example after the application has been deployed for a period of time, such as after a number of weeks or months.

Based on the application above, confidence thresholds for a speech application can be established to reduce the expected number of dialog turns a user may encounter when utilizing the speech application. The thresholds can be established automatically and repeatedly based on data obtained by use of the speech application. Additionally, other parameters for a speech application can be evaluated and adjusted. For example, recognition grammars and dialog structure for the speech application can be adjusted.

Although subject matter above has been described with reference to particular embodiments, workers skilled in the art will recognize that changes may be made in form and detail without departing from the spirit and scope of the appended claims.

What is claimed is:

1. A computer-implemented method comprising:
   identifying possible outcomes for at least one step in a speech application having a plurality of user configurable speech application parameters and assigning a cost for each possible outcome in terms of expected dialog turns, wherein identifying possible outcomes for the at least one step in the speech application comprises developing a cost matrix for the at least one step, wherein the cost matrix includes a probability and associated cost for each of the possible outcomes for the at least one step, the associated cost comprising a floating cost, the floating cost comprising a situation when a first dialog-turn is wasted requiring a user to initiate another dialog-turn, the floating cost comprising a large number when the user is rejected a first time, starts over, and there is a high possibility that the user will be rejected a next time, the floating cost comprising a small number when the user is rejected the first time, starts over, and there is a high possibility that the user will not be rejected the next time;
   accessing recognition results and corresponding confidence scores for the at least one step in the speech application;
   associating each recognition result and corresponding confidence score with one of the possible outcomes based on at least one application parameter from the plurality of user configurable speech application parameters configured by the user;
   calculating a cost for the at least one step based on the association of each recognition result and corresponding confidence score with one of the possible outcomes and the cost for each possible outcome; and
   adjusting, using a processor of the computer, the at least one parameter from the plurality of user configurable speech application parameters configured by the user to reduce the cost for the at least one step.

2. The computer implemented method of claim 1 wherein the at least one parameter includes a confidence threshold.

3. The computer-implemented method of claim 1 wherein the at least one parameter includes:
   a high confidence threshold wherein a recognition result having a corresponding confidence score above the high confidence threshold is accepted; and
   a low confidence threshold wherein a recognition result having a corresponding confidence score below the low confidence threshold is rejected and wherein a recognition result with a corresponding confidence score between the high confidence threshold and the low confidence threshold initiates a confirmation process with a user.

4. The method of claim 3 and further comprising:
   determining a number of recognition results having a corresponding confidence score above the high confidence threshold, a number of recognition results having a corresponding confidence score below the low confidence threshold and a number of recognition results having a corresponding confidence score between the high confidence threshold and the low confidence threshold; and
   calculating the cost for the at least one step based on each number.

5. The method of claim 1 and further comprising:
   assigning a false acceptance penalty to the speech application; and
   estimating the cost for the at least one step based on the false acceptance penalty.

6. The method of claim 5 wherein the false acceptance penalty is assigned based on a desired acceptance rate for the speech application.

7. The method of claim 1 and further comprising determining a number of recognition results associated with each possible outcome and calculating the cost for the at least one step based on the number.

8. A computer-implemented method, comprising:
   identifying possible outcomes for at least one step in a speech application having a plurality of user configurable speech application parameters and assigning a cost to each possible outcome in terms of expected dialog-turns, wherein identifying possible outcomes for the at least one step in the speech application comprises developing a cost matrix for the at least one step, wherein the cost matrix includes a probability and associated cost for each of the possible outcomes for the at least one step, the associated cost comprising a floating cost, the floating cost comprising a situation when a first dialog-turn is wasted requiring a user to initiate another dialog-turn, the floating cost comprising a large number when the user is rejected a first time, starts over, and there is a high possibility that the user will be rejected a next time, the floating cost comprising a small number when the user is rejected the first time, starts over, and there is a high possibility that the user will not be rejected the next time;
   accessing recognition results and corresponding confidence scores for the at least one step in the speech application;
   estimating a first expected dialog-turn value of the speech application for a first set of confidence thresholds based on the recognition results and corresponding confidence scores, wherein the first set of confidence thresholds comprises at least a pair of threshold values;
   estimating a second expected dialog-turn value of the speech application for a second set of confidence thresholds based on the recognition results and corresponding confidence scores, wherein the second set of confidence thresholds comprises at least a pair of threshold values;

comparing, using a processor of the computer, the first expected dialog turn value and the second expected dialog turn value;

selecting one of the first set and second set of confidence thresholds for the speech application, wherein the first set of confidence thresholds is selected if the first expected dialog-turn value is less than the second expected dialog-turn value and the second set of confidence thresholds is selected for the speech application if the second expected dialogturn value is less than the first expected dialog-turn value; and adjusting, using a processor of the computer, at least one parameter from the plurality of user configurable speech application parameters to reduce the cost for the at least one step.

9. The method of claim 8 and further comprising:
identifying possible outcomes for the speech application and assigning a cost to each outcome.

10. The method of claim 9 and further comprising:
associating each recognition result and corresponding confidence score with one of the possible outcomes based on the first set of confidence thresholds and estimating the first expected dialog-turn value based on the cost for said one of the possible outcomes; and
associating each recognition result and corresponding confidence score with one of the possible outcomes based on the second set of confidence thresholds and estimating the second expected dialog-turn value based on the cost for said one of the possible outcomes.

11. The method of claim 8 and further comprising:
assigning a false acceptance penalty to the speech application.

12. The method of claim 11 and further comprising:
estimating the first expected dialog-turn value and the second expected dialog-turn value based on the false acceptance penalty.

13. A computer-implemented method comprising:
identifying possible outcomes for at least one step in a speech application having a plurality of user configurable speech application parameters and assigning a cost to each possible outcome in terms of expected dialog-turns, wherein identifying possible outcomes for the at least one step in the speech application comprises developing a cost matrix for the at least one step, wherein the cost matrix includes a probability and associated cast for each of the possible outcomes for the at least one step, the associated cost comprising a floating cost, the floating cost comprising a situation when a first dialog-turn is wasted requiring a user to initiate another dialog-turn, the floating cost comprising a large number when the user is rejected a first time, starts over, and there is a high possibility that the user will be rejected a next time, the floating cost comprising a small number when the user is rejected the first time, starts over, and there is a high possibility that the user will not be rejected the next time;

accessing recognition results and corresponding confidence scores for the at least one step in the speech application;

identifying a plurality of confidence thresholds, wherein the plurality of confidence thresholds comprise pairs of confidence thresholds, each pair of confidence thresholds comprising a low confidence threshold and a high confidence threshold, wherein, for each pair, recognition results having a corresponding confidence score below the low confidence threshold are rejected, recognition results having a corresponding confidence score above the high confidence threshold are accepted and recognition results having a corresponding confidence score between the low confidence threshold and the high confidence threshold initiate a confirmation process;

for each pair of confidence thresholds,
associating each recognition result and corresponding confidence score with one of the possible outcomes using the pair of confidence thresholds; and
estimating, using a processor of the computer, an expected dialog-turn value for the pair of confidence thresholds based on how many recognition results are associated with each possible outcome and the cost of each possible outcome;

selecting one of the pairs of confidence thresholds for the at least one step in the speech application based on the corresponding expected dialog-turn values for the confidence thresholds; and adjusting, using the processor of the computer, at least one parameter from the plurality of user configurable speech application parameters to reduce the cost for the at least one step.

14. The method of claim 13 and further comprising:
assigning a false acceptance penalty to the speech application; and
estimating each expected dialog-turn value based on the false acceptance penalty.

15. The method of claim 13 and further comprising:
obtaining additional recognition results and corresponding confidence scores for the speech application; and
estimating a second expected dialog-turn value for each of the plurality of confidence thresholds based on how many recognition results and additional recognition results are associated with each possible outcome and the cost of each possible outcome.

16. The method of claim 13 and further comprising:
calculating a probability for each possible outcome by determining a number of recognition results associated with each possible outcome.

17. The method of claim 13, wherein selecting one of the pairs of confidence thresholds comprises:
selecting the threshold pair that has a minimum expected dialog-turn value.

18. The method of claim 13, wherein the probability for each of the possible outcomes is computed as the number of instances for the possible outcome divided by the total number of instances for all of the possible outcomes.

19. The method of claim 13, wherein the associated cost for each of the possible outcomes comprises an indication of an expected number of dialog-turns to complete the at least one step in the speech application.

20. The method of claim 1, wherein the associated cost for each of the possible outcomes comprises an indication of an expected number of dialog-turns to complete the at least one step in the speech application.

* * * * *